United States Patent Office 3,424,979
Patented Jan. 28, 1969

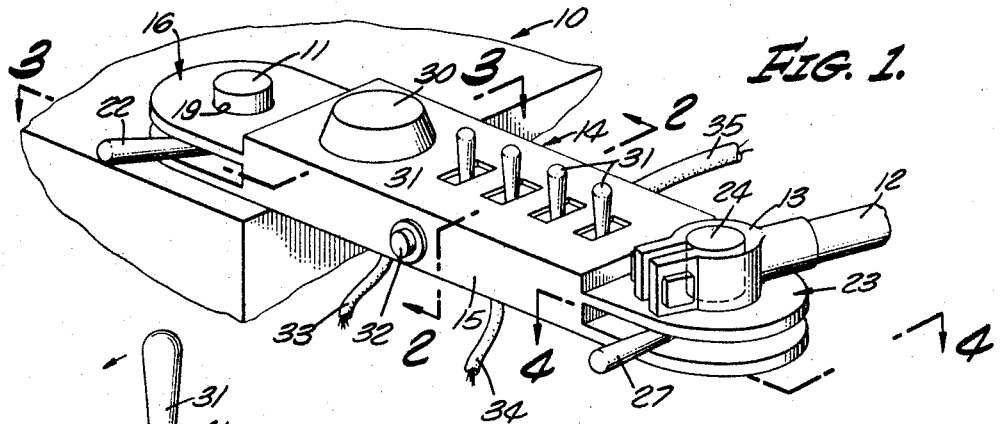
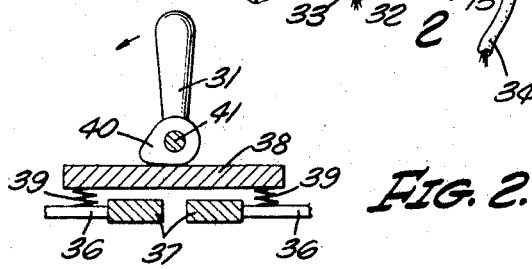
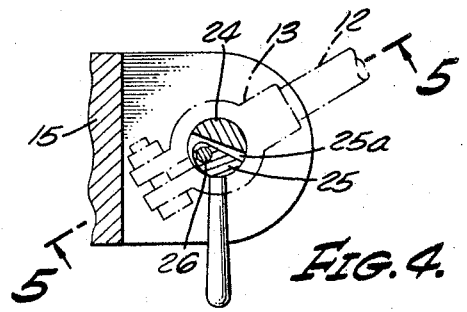
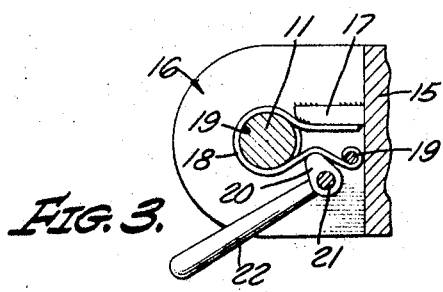
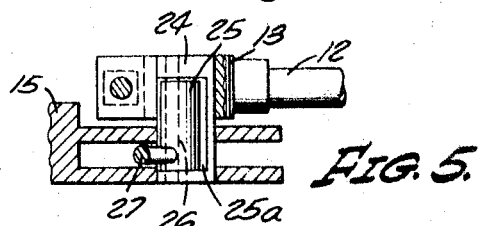
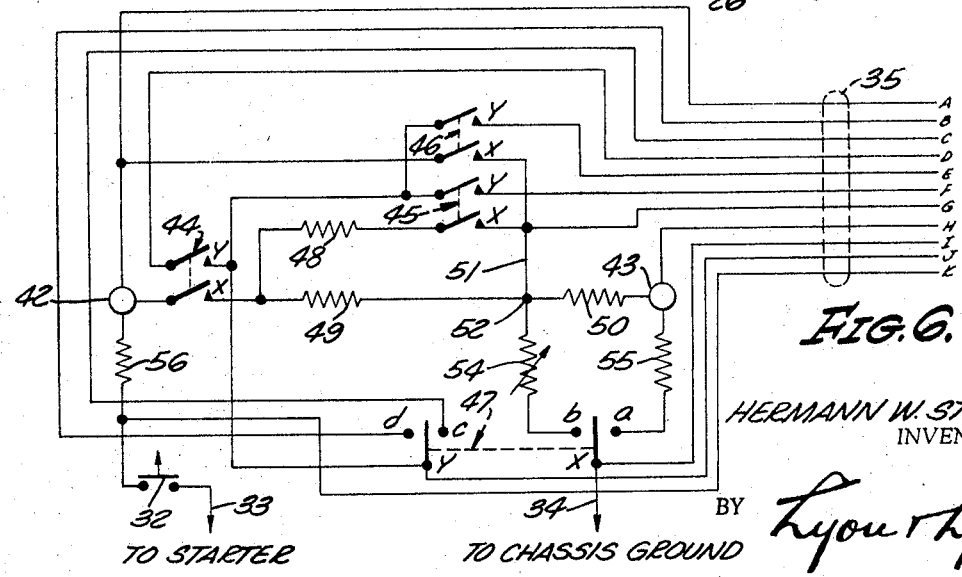

3,424,979
ADAPTOR WITH SWITCHING MEANS AND CONDITION SIMULATING MEANS FOR AUTOMOTIVE IGNITION SYSTEM ANALYSIS
Hermann W. Stocker, Van Nuys, Calif., assignor to Universal Techtronics, Inc., Van Nuys, Calif., a corporation of California
Filed Aug. 27, 1965, Ser. No. 483,187
U.S. Cl. 324—73 10 Claims
Int. Cl. G01r 15/12

ABSTRACT OF THE DISCLOSURE

An adaptor to be inserted in series with the battery and the ignition system of an automobile for ignition system analysis, the adaptor including a plurality of switching means for actuating portions of the ignition system to thereby control the operation of the engine, and also including circuit means for simulating various ignition or engine conditions to determine the response of the system under analysis.

---

The present invention is generally related to the field of test equipment employed in the analysis of automobile engine performance. More specifically, the present invention relates to an adaptor to be inserted in an automobile electrical system which permits the control of that system and facilitates the testing of various aspects of the system.

In automobiles of present manufacture, there is a considerable variety of performance characteristics which it is necessary to check in order to perform a complete analysis. Due to the increase in the complexity of automobile engines and particularly the electrical systems, the number of such characteristics which are important has grown and therefore, the number of individual measurements which must be made has also increased. This increase in complexity has also made access to the test points more difficult. In many modern vehicles, the entire wiring system is permanently enclosed in wiring harnesses or otherwise enclosed in the components themselves so that direct and independent connections to the desired test points cannot be made. Even in instances where access is permitted, it becomes a time consuming operation to connect, test, check and disconnect for each of the desired tests.

Accordingly, it is an object of the present invention to provide an adaptor which can be connected into an automobile electrical system and to which test equipment can be connected in order to quickly analyze the system.

More specifically, it is an object of this invention to provide an adaptor which is relatively unaffected by the inaccessibility of test points in an electrical system.

It is a further object of the present invention to provide an adaptor for use in the testing of a vehicle electrical system which reduces the time and complexity of the performance of the analysis by incorporating within the device, means for switching, stimulating, loading and controlling the performance of the engine without the necessity for further changes in test lead connections.

It is also an object of the present invention to provide an adaptor switch which is capable of applying various types of loads to the electrical system without the necessity for further supplemental connections, whereby various conditions of engine performance may be simulated in order to determine whether the electrical system will respond correctly thereto.

It is another object of the present invention to provide an adaptor switch which can be quickly and easily inserted in the electrical system without the necessity for special tools, yet achieving good electrical contact in the system.

Further objects and advantages of the present invention will become apparent upon reading the following detailed description in conjunction with the accompanying drawing, in which:

FIGURE 1 is a perspective view of the adaptor of the present invention illustrating its interconnection between a battery and a battery cable.

FIGURE 2 is a sectional view taken along line 2–2 of FIGURE 1 illustrating a preferred embodiment of switch.

FIGURE 3 is a sectional plan view taken along line 3–3 of FIGURE 1 illustrating the details of the connection of the adaptor to a battery terminal post.

FIGURE 4 is a sectional plan view taken along line 4–4 of FIGURE 1 illustrating the connection of the adaptor to the battery cable.

FIGURE 5 is a sectional elevation taken along line 5–5 of FIGURE 4.

FIGURE 6 is a schematic diagram of circuit employed in the adaptor of the present invention.

A conventional automobile electrical system includes a storage battery having one terminal connected to ground and the other connected to the operative portions of the system. FIGURE 1 shows a portion of a storage battery 10 with one of its terminal posts 11, the other terminal post (not shown) being the one connected to the vehicle chassis forming the ground reference of the electrical system. A battery cable 12 employing the split cable clamp 13 would normally be connected to the terminal 11 prior to the insertion of the adaptor device.

The adaptor, generally designated 14, comprises a generally rectangular housing 15 having at each end thereof, male and female terminal connectors. The female connector 16 of adaptor 14 receives the battery terminal post 11 therein and attaches securely to it. FIGURE 3 shows in plan view, one embodiment of such a connector 16. A boss 17 attached to the housing 15 carries a metal strip or band 18 securely attached at one end to the boss 17, and has the other end thereof tied to a vertical post 19. The length of band 18 is sufficient so that it will extend around the vertical bore 20 in connector 16 which receives therein terminal post 11. A camming member 20 is pivotally mounted at 21 near the point where the band 18 is tied to the post 19. A toggle arm 22 is attached to camming member 20 so that the same can be rotated about its pivot 21.

When the adaptor 14 is desired to be connected to the battery 10, the cable clamp 13 is loosened and the cable 12 is removed from the terminal post 11. The female connector 16 is then secured to the terminal post 11 by inserting it in the bore 20. The toggle arm 22 is then rotated so that the camming member 20 deforms the band 18 and tightens it securely about the periphery of the terminal post 11. No extra tools are needed to connect the adaptor. In some older vehicles, the condition of the battery terminal post becomes deteriorated due to corrosion and oxidation of the lead terminal post augmented by the acid fumes from the battery. Prior to the attachment of the adaptor, it may be necessary to remove the worst parts of corrosion from the terminal post, but the quick-connect feature of the connector 16 allows an extremely tight connection to be made to the terminal post 11 so that it is not necessary to clean the post scrupulously in order to obtain a low resistance connection thereto.

At the other end of adaptor 14 is the male connector 23. As shown in FIGURES 4 and 5, the male connector 23 comprises essentially a dummy terminal post 24 approximating in size and proportions to the original post 11. Thus, the cable clamp 13 is readily slipped over the dummy post 24 without any special adjustment or deformation thereof. In order to secure a low resistance connection to the clamp 13, the dummy post 24 is provided with a segment 25 mounted in a cavity 25a formed in the post 24 and pivoted at 26 at a point not coaxial with post 24. A toggle arm 27 is attached to the segment 25 so that it may be rotated about its pivot 26. This eccentric segment 25 thus permits a tight physical contact to be made on the inner periphery of the clamp 13 where it is ordinarily unaffected by corrosion. No further adjustment need be made to the tightening bolt 28 or nut 29 after they have been loosened sufficiently to detach the clamp 13 from the terminal post 11.

The interior of housing 15 contains the elements which are shown schematically in the circuit diagram of FIGURE 6. FIGURE 1 shows the control knob 30 of rheostat 54 and the projecting toggle arms 31 of the various switches contained in housing 15. Additionally, housing 15 carries a button switch 32 used to activate the starter motor of the vehicle. Cables 33 and 34 extend from the adaptor 14 for connection to the starter motor and to chassis ground. A third electrical cable 35 contains the test leads extending to the actual vehicle test equipment.

FIGURE 2 shows in diagrammatic form, a preferred embodiment of switch device to be employed herein. In these electrical systems, current values are normally quite high and considerable losses can be introduced by the contact resistance of switches employed therein. One method of decreasing the possibility of large contact resistance is to increase the contact area of the switch parts. Accordingly, FIGURE 2 shows the incoming electrical leads 36, each of which terminate in larger planar contacts 37. A large planar switch part 38 is situated immediately adjacent the contacts 37 and is urged upwardly and away therefrom by the springs 39. Of course, springs 39 make no electrical connection to the wire leads 36. A camming member 40 is pivotally mounted at 41 immediately above the switch part 38 and has the toggle arm 31 attached thereto. Pivoting the toggle arm 31 causes the cam 40 to urge the switch part 38 downward so that it shunts across the contact members 37 completing the electrical circuit. It will be seen from this diagrammatic view that the contact areas of the switch parts are exceedingly large so that the current density will be decreased and distributed evenly over the contact surfaces resulting in a low resistance coupling. The configuration of the camming piece 40 permits considerable downward force to be applied to the switch part 38 so that firm physical contact can be made to further decrease the contact resistance.

While FIGURES 1 and 2 illustrate the use of switches which are manually operated at the adaptor itself, it is contemplated that such switching operations could be performed automatically by signals emanating from the testing apparatus. In such situations, the switches could be actuated by means of solenoids or other equivalent methods as each of the various desired tests is performed.

Turning now to the circuit diagram of FIGURE 6, the battery terminal contact obtained through the band 18 of connector 16 is designated 42, and the dummy, quick-connect terminal post is designated 43. The four switches illustrated in FIGURE 1 are designated 44, 45, 46 and 47. Switches 44, 45 and 46 are each shown as single-throw, double-pole switches, each having the contacts $x$ and $y$. Switch 47 is a double-pole, double-throw switch in which the poles are designated $x$ and $y$, and the contacts are designated $a$, $b$, $c$ and $d$ as shown. The provision of the dual contact switches provides for a "go-no-go" interlocking feature whereby the operator at the test equipment can determine whether the proper switches have been thrown to conduct each particular test. The switch positions $44y$, $45y$, $46y$, $47yd$ and $47yc$ each connect through the cable 35 extending to the test equipment stand and appear at terminals B, C, D, F and J therein. For example, when switch 44y is closed, the circuit will be completed between termials D and J. This interlock circuit can be utilized to provide either a visual indication to the operator or to control a relay, or the like, which then would permit current to pass in various of the other leads depending on the particular test to be performed.

Switch contact $44x$ completes the circuit between the female battery terminal connector 42 and the series-resistors 49 and 50. Resistor 50 is in turn attached to the male battery cable connector 43. Resistor 48 is connected through the switch contacts $45x$ which places it in shunt across resistor 49 by means of the connection 51 to the point 52 between the series resistors 49 and 50. The contacts of switch $46x$ connect the female terminal contact 42 to the junction point 53 connected in parallel with the contacts of switch $45x$. A variable rheostat 54 is connected to the junction point 52 and to the terminal $b$ of switch $47x$. A fixed load resistor 55 is connected between the dummy terminal post connection 43 and terminal $a$ of switch $47x$. The center post or terminal of switch $47x$ is coupled through the cable 34 to be connected to the chassis ground of the vehicle. A current limiting resistor 56 is coupled between the female connector 42 and the starter button switch 32 and in turn is coupled through the cable 33 which is adapted to be connected to the starter motor solenoid.

The leads across which actual test measurements may be made are those designated A, G, H, I and K. Terminal A is connected directly to the female connector 42 and to the switch $46x$. Terminal G is coupled directly to the junction point 53. Terminal H connects directly to the terminal post connector 43 and terminal I is connected directly to the center terminal of switch $46x$ which will be coupled to ground potential. Terminal K is connected directly to the side of current limiting resistor 56 opposite the connector 42.

Employment of the adaptor of the present design using the circuitry shown in FIGURE 6 enables one to perform a large number of tests without further connections being made to the engine electrical system. In addition, by the employment of solenoid or relay operated switches, these tests could be made automatically. Included among the tests which may be made are the following.

Battery voltage with and without load, point resistance, resistance in the primary coil, condition of the starter motor and the starter solenoid, current and voltage output of the regulator during charging, operation of the regulator cut-out relay, and output of the generator or alternator. A brief outline of how these tests could be performed using the adaptor of the present invention will aid in an understanding of the unique features thereof.

*No-load battery voltage.*—With all switches open, a voltage check would be made across terminals A and I.

*Battery voltage under load.*—Closing switch 46 and moving switch 47 to its $a$, $c$ position will place resistor 55 having a larger, known value across the battery to ground potential. By then checking the voltage drop at terminals A and I, the condition of the battery under load can be immediately determined. For this test, the engine is not running.

*Point resistance.*—Switch 44 is closed placing resistor 49 and resistor 50 in series with the battery. Switch 32 is then depressed momentarily to rotate the engine until the ignition points are closed. Resistor 49 will limit current in the primary circuit in order to prevent burning the points during this test. The point resistance is then determined by measuring the current at terminals A and G.

*Primary resistance.*—To perform this test, one extra connection is required. Switch 44 is closed and switch 32 actuated until the ignition points are closed. A voltage check is then made between terminal A and the terminal on the ignition coil to determine the voltage drop in the primary thereof.

*Starter motor condition.*—Switch 46 is closed placing the resistor 50 in series with the battery and the switch 32 is depressed so that the motor is being cranked by the starter motor. Resistor 50, being of relatively low value, acts as a current shunt, and, by measuring the voltage drop across resistor 50 at terminals G and H, the current drawing requirements of the starter motor are determined.

*Starter motor solenoid.*—With all other switches open, switch 32 is closed, actuating the starter motor solenoid, but since no power is fed to the starter motor, no cranking will ensue. By checking the voltage drop across resistor 56 at terminals A and K, it can be determined what the current requirements of the starter solenoid are.

*Regulator charging voltage.*—With switch 46 closed, the engine is started by turning on the ignition and depressing switch 32 and the engine is allowed to stabilize at idling speed. The voltage level is checked between terminals H and I. Although resistor 50 will be in series with the battery, it has very low resistance value and at common charging voltage levels, such as 12 volts, the error introduced by the voltage drop in resistor 50 will be negligible.

*Regulator charging current.*—With the engine still running as in the previous test, and with switch 46 closed, a voltage check is made between terminals G and H connected across resistor 50 to determine the current flow therethrough.

*Regulator cut-out relay.*—This has reference to the relay in the voltage regulator which cuts off charging current to the battery when the battery returns to full charge. In order to prevent over or undercharging, it is important to determine whether this relay cuts out at the proper level. Closing switches 44 and 45 places resistors 48 and 49 in series-parallel with resistor 50 whereby the total resistance simulates that of a charged battery. This is on the order of one-quarter ohm. A check of terminals G and H for a current drop, or terminals G and I for a voltage drop at the time switch 45 is actuated will determine whether the cut-out relay operates at the right level. By thus stimulating the electrical system artificially, it is not necessary to wait until the engine has run long enough to recharge the battery in order to see whether the cut-out relay works at the right time.

*Generator output.*—Switch 46 is closed and switch 47 is moved to its *b, d* position. This places resistor 50 in series with the battery and inserts the rheostat 54 as a shunt across the battery to ground. By adjusting the rheostat 54 to a desired position, a known load can be added to the system. With the engine running, terminals G and H are sampled by the test equipment to determine the current output of the generator or alternator as determined across the main current shunt resistor 50.

While the above tests were described in conjunction with the specific circuitry shown in FIGURE 6, it is understood that changes may be made in this circuitry to perform these same tests in slightly different ways. FIGURE 6 is offered herein as one embodiment of a circuit for use in the adaptor of the present invention. While these and other specific embodiments of the present invention have been shown and described, it will be obvious to those persons skilled in the art that changes and modifications might be made without departing from the invention in its broader aspects and, therefore, it is the aim of the appended claims to cover all such changes and modifications as fall within the true scope and spirit of this invention.

I claim:

1. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said connector means comprising male and female connectors, said female connector adapted to receive the terminal post of said storage battery, said male connector adapted to receive said battery cable, said male and female connectors each having means for rapidly engaging and disengaging said battery cable and said terminal post, respectively; said housing containing circuit means, said circuit means coupled to said connector means, a plurality of switch means on said housing, said switch means coupled to said circuit means; means for electrically coupling said circuit means to said automotive electrical system; means for coupling said circuit means to said system analyzers; said switch means operative to connect portions of said circuit means into said electrical system and to said system analyzer.

2. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said connector means comprising male and female connectors, said female connector comprising a band mounted to form a loop, said loop positioned to receive the terminal post of said storage battery, means for tightening said loop about said terminal post forming electrical contact therewith, said male connector comprising a dummy terminal post, said dummy terminal post having substantially the same configuration as the aforesaid terminal post of said storage battery, said dummy terminal post having a cavity extending vertically along one side thereof, an eccentrically mounted vertical segment, said segment being pivotally supported in said cavity and having a horizontally extending pivot arm attached thereto, said battery cable having a cable clamp, said dummy terminal post adapted to receive said clamp thereon, said eccentrically mounted segment operative to form electrical contact between said post and said clamp; said housing containing circuit means, said circuit means coupled to said connector means, a plurality of switch means on said housing, said switch means coupled to said circuit means; means for electrically coupling said circuit means to said automotive electrical system; means for coupling said circuit means to said system analyzer; said switch means operative to connect portions of said circuit means into said electrical system and to said system analyzer.

3. In an automotive electrical system analyzer wherein said electrical system includes a storage battery and battery cables connected to said system, an adaptor switch and test condition simulator comprising a housing, a connector means on said housing for coupling said adaptor in series with said battery and one of said battery cables; said connector means comprising male and female connectors, said female connector comprising a band mounted to form a loop, said loop positioned to receive the terminal post of said storage battery, means for tightening said loop about said terminal post forming electrical contact therewith, said male connector comprising a dummy terminal post, said dummy terminal post having substantially the same configuration as the aforesaid terminal post of said storage battery, said dummy terminal post having a cavity extending vertically along one side thereof, an eccentrically mounted vertical segment, said segment being pivotally supported in said cavity and having a horizontally extending pivot arm attached thereto, said battery cable having a cable clamp, said dummy terminal post adapted to receive said clamp thereon, said eccentrically mounted segment operative to form electrical contact between said post and said clamp; said housing containing circuit means, said circuit means coupled to said connector means, a plurality of switch means on said housing, said switch means coupled to said circuit means, said switch means comprising two or more contact parts, said contact parts having enlarged planar contact surfaces, a movable switch part, said movable part having a planar contact surface, resilient means biasing said movable part away from said contact parts, and means for actuating said switch means to move said parts into electrical contact, means for electrically coupling said circuit means to said automotive electrical system; means for coupling said circuit means to said system analyzer; said switch means operative to connect portions of said circuit means into said electrical system and to said system analyzer.

4. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said housing containing circuit means, said circuit means coupled to said connector means, a plurality of switch means on said housing, said switch means coupled to said circuit means; said switch means comprising two or more contact parts, said contact parts having enlarged planar contact surfaces, a movable switch part, said movable part having a planar contact surface, resilient means biasing said movable part away from said contact parts, and means for actuating said switch means to move said parts into electrical contact; means for electrically coupling said circuit means to said automotive electrical system; means for coupling said circuit means to said system analyzer; said switch means operative to connect portions of said circuit means into said electrical system and to said system analyzer, said switch means including interlock means, said interlock means connected to said system analyzer, said interlock means responsive to the condition of said switch means.

5. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said connector means comprising male and female connectors, said female connector comprising a band mounted to form a loop, said loop positioned to receive the terminal post of said storage battery, means for tightening said loop about said terminal post forming electrical contact therewith, said male connector comprising a dummy terminal post, said dummy terminal post having substantially the same configuration as the aforesaid terminal post of said storage battery, said dummy terminal post having a cavity extending vertically along one side thereof, an eccentrically mounted vertical segment, said segment being pivotally supported in said cavity and having a horizontally extending pivot arm attached thereto, said battery cable having a cable clamp, said dummy terminal post adapted to receive said clamp thereon, said eccentrically mounted segment operative to form electrical contact between said post and said clamp; said housing containing circuit means, said circuit means coupled to said connector means, a plurality of switch means on said housing, said switch means coupled to said circuit means; said switch means comprising two or more contact parts, said contact parts having enlarged planar contact surfaces, a movable switch part, said movable part having a planar contact surface, resilient means biasing said movable part away from said contact parts, and means for actuating said switch means to move said parts into electrical contact, means for electrically coupling said circuit means to said automotive electrical system; means for coupling said circuit means to said system analyzer; said switch means operative to connect portions of said circuit means into said electrical system and to said system analyzer, said switch means including interlock means, said interlock means connected to said system analyzer, said interlock means responsive to the condition of said switch means.

6. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said housing containing circuit means, said circuit means coupled to said connector means, a plurality of switch means on said housing, said switch means coupled to said circuit means; means for electrically coupling said circuit means to automotive electrical system; means for coupling said circuit means to said system analyzer; said switch means operative to connect portions of said circuit means into said electrical system and to said system analyzer; said circuit means including resistance means coupled in series with said battery terminal connector and the starter motor solenoid of said automotive electrical system, said analyzer coupling means including means coupled to said resistance means for detecting the current therethrough.

7. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said housing containing circuit means, said circuit means coupled to said connector means, a plurality of switch means on said housing, said switch means coupled to said circuit means; means for electrically coupling said circuit means to said automotive electrical system; means for coupling said circuit means to said system analyzers; said switch means operative to connect portions of said circuit means into said electrical system and to said system analyzer; said circuit means including first resistance means coupled in series with said battery terminal connector and the starter motor solenoid of said automotive electrical system, a second resistance means, said switch means connecting said second resistance means in series with said starter motor, said analyzer coupling means including means connected to said second resistance means for detecting the current flow therein.

8. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said housing containing circuit means, said circuit means coupled to said connector means, a plurality of switch means on said housing, said switch means coupled to said circuit means; means for electrically coupling said circuit means to said automotive electrical system, means for coupling said circuit means to said system analyzer; said switch means operative to connect portions of said circuit means into said electrical system and to said system analyzer; said circuit means including resistance means, said switch means connecting said resistance means in series with said battery terminal connector and with said electrical system, said analyzer coupling means including means connected to said resistance means to determine current flow therein when the electrical system is operating.

9. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables; said housing containing circuit means, said circuit means coupled to said connector means, a plurality of switch means on said housing, said switch means coupled to said circuit means; means for electrically coupling said circuit means to said automotive electrical system; means for coupling said circuit means to said system analyzer; said switch means operative to connect portions of said circuit means into said electrical system and to said system analyzer; said circuit means including fixed load resistance means, said switch means connecting said resistance means in shunt across said battery, said analyzer coupling means including means detecting the voltage across said resistance means.

10. In an automotive electrical system analyzer wherein said electrical system includes a storage battery and battery cables connected to said system, an adaptor switch and test condition simulator comprising a housing, connector means on said housing for coupling said adaptor in series with said battery and one of said battery cables;

said housing containing circuit means, said circuit means coupled to said connector, a plurality of switch means on said housing, said switch means coupled to said circuit means; means for electrically coupling said circuit means to said automotive electrical system; means for coupling said circuit means to said system analyzer; said switch means operative to connect portions of said circuit means into said electrical system and to said system analyzer; said circuit means including a variable rheostat, said switch means operative to couple said rheostat in shunt across said battery.

References Cited

UNITED STATES PATENTS

| | | | |
|---|---|---|---|
| 2,088,355 | 7/1937 | Wehming | 324—23 |
| 2,803,725 | 8/1957 | Ott | 200—165 XR |
| 3,166,650 | 1/1965 | Heidrich | 324—29.5 XR |

RUDOLPH V. ROLINEC, *Primary Examiner.*

E. L. STOLARUM, *Assistant Examiner.*

U.S. Cl. X.R.

200—52; 324—29.5